Jan. 28, 1964 R. H. LOUGHRAN 3,119,333
AERIAL VEHICLE CONSTRUCTION
Filed Jan. 4, 1960 2 Sheets-Sheet 1
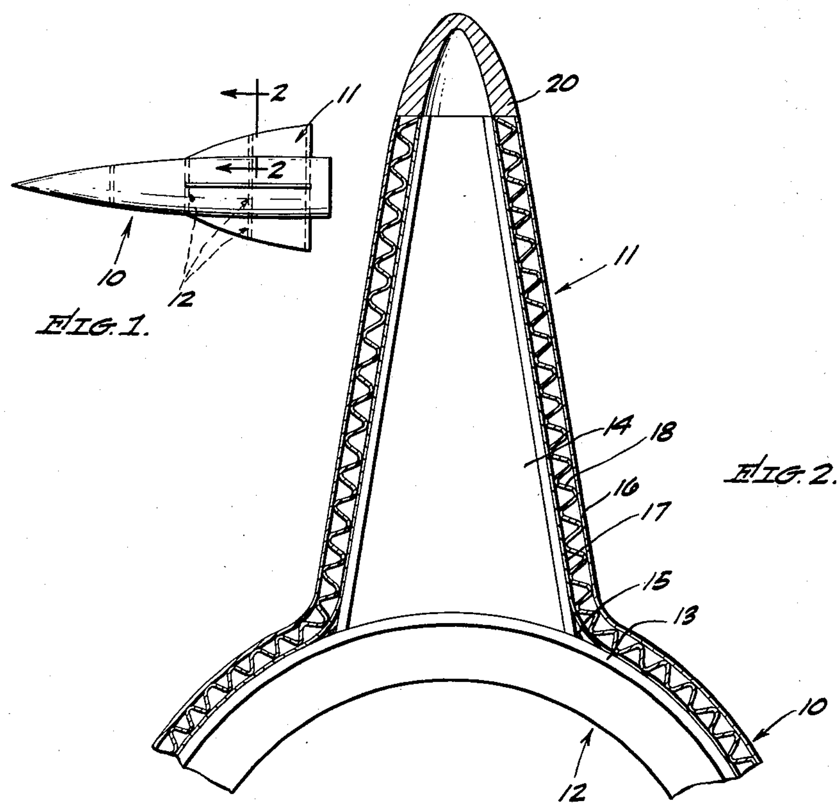
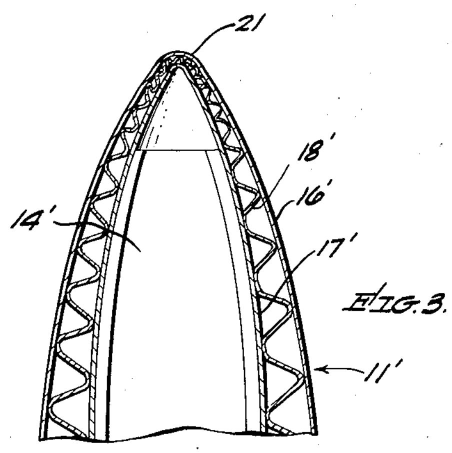
INVENTORS.
ROBERT H. LOUGHRAN,
BY
Donald L. Royer
AGENT.

Jan. 28, 1964 R. H. LOUGHRAN 3,119,333
AERIAL VEHICLE CONSTRUCTION
Filed Jan. 4, 1960 2 Sheets-Sheet 2
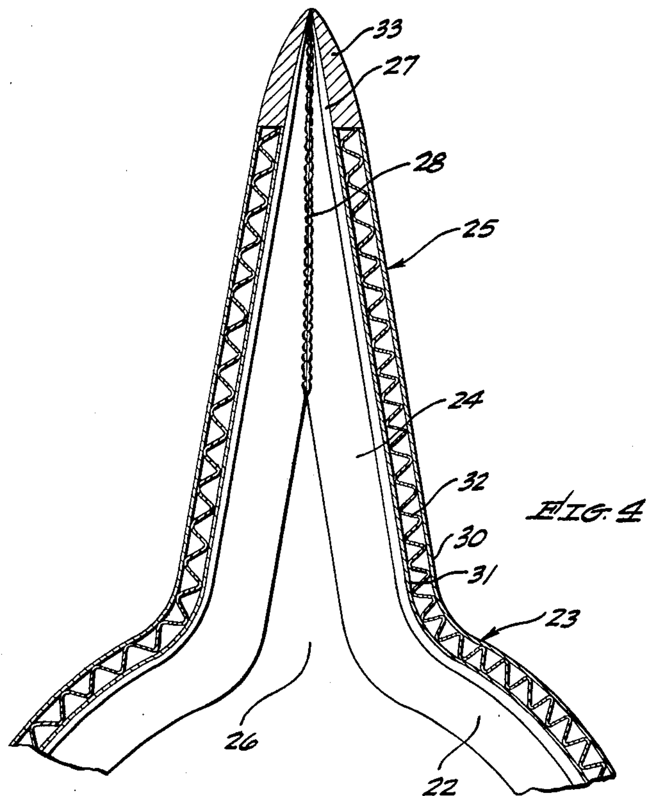
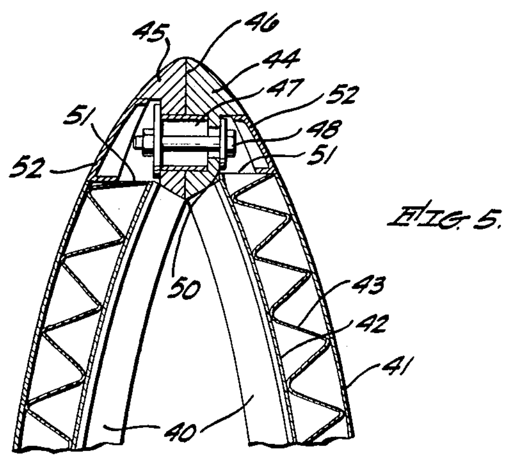
INVENTOR.
ROBERT H. LOUGHRAN,
BY
[signature]
AGENT

United States Patent Office 3,119,333
Patented Jan. 28, 1964

3,119,333

AERIAL VEHICLE CONSTRUCTION

Robert H. Loughran, Playa Del Rey, Calif., assignor to Hughes Aircraft Company, Culver City, Calif., a corporation of Delaware Filed Jan. 4, 1960, Ser. No. 445
2 Claims. (Cl. 102—50)

This invention finds particular utility in the field of vehicular structural construction and relates particularly to the construction of portions of aerial vehicles and particularly such vehicles that are intended to be subjected to elevated temperatures.

Many contemporary aerial vehicles are intended for atmospheric travel at sufficient speeds as to produce considerable aerodynamic heating of the skin as well as other portions of the body or fuselage, wings, fins and the like. With contemporary and conventional types of body, wing, and fin construction, that is, the use of spaced transversed disposed ribs and longitudinally extending spars, considerable difficulty has been encountered due to the differential coefficients of expansion of materials utilized therein, together with variations in differential expansion between portions of the vehicle forming an outer surface or skin and portions thereof forming the frame or skeletal structure thereof. In the presence of aerodynamic heating conditions, outer surfaces of the aerial vehicle become heated more rapidly than inner surfaces, thus producing the normally unavoidable differential expansion conditions. With elements of the fuselage, wings, fins and the like being relatively rigidly secured together both circumferentially and longitudinally, this differential expansion of portions of the vehicle produces wrinkling, warping and/or breaking of various components and subsequent destruction or severe malfunction of the vehicle.

Heretofore, attempts have been made to solve the problems set forth hereinbefore through use of expansion joints, slip fittings, corrugated sections and the omission of certain structural elements of the aerial vehicles. These attempts have proven unsatisfactory, inasmuch as reduced structural strength is encountered and, in many instances, undesired additions of weight through use of special components is introduced.

In aerial vehicles, particularly those subjected to high compressive and shock forces as well as aerodynamic heating, there are not only cannot be any sacrifice of strength but, in most instances, elements thereof must present increased strength over other vehicles which do not encounter such forces.

It is therefore one important object of the present invention to provide a structural arrangement wherein differential changes in size are compensated for without sacrifice of structural strength.

It is another object of the invention to provide an aerial vehicle structural construction including expanded core of cellular element structures.

Still another object of the invention is to provide a means for forming or attaching a wing or fin to an aerial vehicle body or fuselage and in a manner to permit differential expansion or contraction of components thereof.

A still further important object of the invention is to provide a fin or wing construction for an aerial vehicle together with a means for joining components thereof.

Other and further important objects of the invention will become apparent from the disclosures in the following detailed specification, appended claims and accompanying drawings, wherein:

FIGURE 1 is a partially diagrammatic side elevational view of a typical aerial vehicle employing the features of the present invention;

FIG. 2 is an enlarged, fragmentary, transverse sectional view through a portion of the fuselage and fin of the typical vehicle illustrated in and taken substantially as indicated by line 2—2, FIG. 1;

FIG. 3 is a fragmentary, sectional view showing another form of the present construction and a particular method of forming an outer edge or tip of a vehicular fin;

FIG. 4 is a sectional view similar to FIG. 2 showing a modified form of construction employing the principles of the present invention; and FIG. 5 is an enlarged fragmentary sectional view showing a modified method of attaching components of the present fin construction.

With reference primarily to FIG. 1, the typical embodiment of an aerial vehicle is shown as including a fuselage 10 and a plurality of fins 11. The fuselage and fins are also shown as including a plurality of ribs or stiffening members indicated generally at 12 and which are longitudinally spaced and transversely disposed within the vehicle. The vehicle shown in FIG. 1 is by way of example only, and it is to be understood that the present invention may be incorporated in any of the various types of aerial vehicles, now known or devised in the future and intended for ground or aerial travel, without departing from the spirit and scope hereof.

With reference to the form of the invention shown in FIG. 2, the ribs 12 may be L, T or U-shaped and have an outer wall portion 13. The configuration of the ribs 12 is such as to conform to the general desired outer configuration of the vehicle. In the area of the fins 11, each of the ribs 12 has an extension portion 14 that may be in the form of a channel or the like that is secured to or formed from each rib 12. In the particular arrangement illustrated in FIG. 2, the extension portion or web 14 is shown as welded as at 15 to the outer portion 13 of the rib 12.

As further shown in FIG. 2, the outer surface of the vehicle comprises a cellular structure or sandwich of multiple components. While the particular construction is by way of example only, the illustrated arrangement includes an outer skin 16 and an inner skin 17 that are separated by means of a corrugated element 18. The material of the skins 16 and 17, as well as element 18, are such as to permit substantially identical expansion characteristics with variations in temperatures therethrough. For example, the outer skin 16 may be made from stainless steel, the corrugated element 18 from beryllium copper and the inner skin 17 from high thermal conductivity high strength steel. The element 18 is also secured to the skins 16 and 17 as by welding or the like or by any of the known methods common in the construction of cellular elements of this type. While the element 18 is shown as being corrugated, it is to be understood that this element may take other forms or may comprise multiple layers without departing from the spirit and scope of the invention. The primary purpose of the sandwich construction relates to the provision of a high strength material having low-weight characteristics. The inner skin 17 is secured to the ribs and rib portions in the fins as by welding, structural adhesives or the like.

The outer peripheral edge of the fin 11, as shown in FIG. 2, is provided with a cap or tip 20 that may, in one form of the invention, be a solid element defining the particular desired configuration and secured to the sandwich material in any known manner such as, for example, as by welding. FIG. 3 represents another form of peripheral edge or tip construction wherein like parts are represented by single primed reference numerals. In this form of the invention, the sandwich material comprising the skins 16' and 17' and the core element 18' are crushed as at 21 to form the desired configuration.

With reference to FIG. 4, a further form of the invention is shown. In this form of the invention, ribs 22 extend only partially about the fuselage or body portion 23 and have integral portions 24 which extend outwardly within a fin 25 thus defining a space 26 therebetween. In other words, the ribs 22 have circumferentially spaced ends with the portions 24 extending therefrom. The portions 24 are suitably contoured as at 27 and may be secured together as by a seam weld 28 on the axis of the fin 25. This particular form of the invention also includes the cellular outer wall arrangement defined by an outer skin 30, an inner skin 31 and a corrugated element 32 that are similar in construction to the sandwich material or cellular arrangement described hereinbefore. In this particular form of the invention, the ribs may extend for disposition within a formed tip arrangement 33.

It may thus be seen that sufficient strength in the aerial construction of this invention is obtained through use of the particular rib construction and without the use of longitudinal stringers or spars. The cellular outer wall or skin provides the sole interconnection between the plurality of ribs and rib fin forming portions. Accordingly, the present structure is light in weight and the aerial vehicle may be constructed in a simple, more efficient manner. In instances where longitudinal expansion differentials may be encountered, the form of the invention shown in FIG. 2 serves to provide the means for compensating for such expansion and limiting or preventing buckling or wrinkling of the vehicle skin or other components. In instances where circumferential as well as longitudinal differential expansion may be encountered, the form of the invention as shown in FIG. 4 is most satisfactory. This particular form of the invention also eliminates problems caused by a covering of a portion of the body beneath the wing root and the associated high differential expansion as between such a portion and the exposed areas of the skin.

With reference to FIG. 5, it is to be noted that this invention lends itself particularly to an aerial vehicle construction wherein portions of the body or fuselage and the fins may be removed for service or insulation of equipment. With a longitudinal parting line being defined along outer peripheral edges of the fins, quarter or half sections of the vehicle may be removed as desired for the purposes described. The arrangement in FIG. 5 includes rib elements 40 that have attached thereto a cellular arrangement comprising an outer skin 41, an inner skin 42 and a corrugated element 43. A tip arrangement is formed by means of tip members 44 and 45 that are secured to the rib elements 40 as by welding or the like, there being a parting plane 46 defined therebetween. Each of the elements 44 and 45 have aligned recesses in which a tubular dowel 47 is disposed. The dowel 47 is retained in position and the elements 44 and 45 in contact with each other by means of a bolt and nut arrangement 48 together with suitable washers 50 which engage shoulders formed on the elements 44 and 45 and defined as the base of outwardly directed recesses 51. The recesses 51 have their outer ends closed by means of closure members 52, the outer surfaces of which are coextensive with the desired outer configuration of the fin.

It may thus be seen that the present invention provides a means by which aerial vehicles, that may encounter aerodynamic heating, are constructed whereby to compensate for thermally induced differential expansion. Additionally, a considerable reduction in weight is provided without a sacrifice of structural strength. It is desired to emphasize the structural weight reduction through use of the construction of the present invention, inasmuch as small changes in atmospherically operable aerial vehicle structural weight will cause large changes in the necessary power requirements, system costs and effective capability of the vehicle. Additionally, contemporary aerial vehicles encounter increasingly severe thermal environments which necessitate structural heat protection together with minimized structural weight. This is a particular necessity in short duty cycle atmospherically operable aerial vehicles.

Having thus described the invention in the present several detail embodiments thereof, it is desired to emphasize the fact that many further modifications may be resorted to in a manner limited only by a just interpretation of the following claims.

I claim:

1. An aerial vehicle structural construction comprising, in combination: an elongated body structure; a plurality of outwardly extending fins disposed from said body structure; a plurality of transversely disposed longitudinally spaced ribs in said body structure, portions of said ribs lying within a longitudinal length of said fins extending into said fins, said ribs having circumferential ends disposed in spaced relationship within a root of said fins; a multielement cellular skin disposed about and secured to said ribs, said cellular skin providing a sole longitudinal interconnecting element between said longitudinally spaced ribs; and means extending from said portions of said ribs for defining a peripheral tip for each of said fins.

2. An aerial vehicle structural construction according to claim 1 wherein said peripheral tip means comprises a formed cap secured to outer ends of said portions of said ribs.

References Cited in the file of this patent

UNITED STATES PATENTS

| | | |
|---|---|---|
| 2,596,435 | Robert | May 13, 1952 |
| 2,627,231 | Kraemer | Feb. 3, 1953 |
| 2,836,267 | Reinhold | May 27, 1958 |
| 2,957,309 | Kobbeman | Oct. 25, 1960 |
| 2,966,117 | Lauritsen | Dec. 27, 1960 |